United States Patent
Rice et al.

(10) Patent No.: US 11,233,249 B1
(45) Date of Patent: Jan. 25, 2022

(54) ADVANCED SELECTIVELY GAS PERMEABLE ANODE FLOW FIELD DESIGN FOR EFFICIENT REMOVAL OF CARBON DIOXIDE IN A DIRECT FORMIC ACID FUEL CELL

(71) Applicant: TENNESSEE TECHNOLOGICAL UNIVERSITY, Cookeville, TN (US)

(72) Inventors: Cynthia Rice, Cookeville, TN (US); Shadi A. Saeed, Auburn Hills, MI (US); Michael Renfro, Cookeville, TN (US); Antonio Pistono, Pittsburgh, PA (US)

(73) Assignee: Tennessee Technological University, Cookeville, TN (US)

( * ) Notice: Subject to any disclaimer, the term of this patent is extended or adjusted under 35 U.S.C. 154(b) by 106 days.

(21) Appl. No.: 15/905,573

(22) Filed: Feb. 26, 2018

Related U.S. Application Data

(60) Provisional application No. 62/462,970, filed on Feb. 24, 2017.

(51) Int. Cl.
*H01M 8/0258* (2016.01)
*H01M 4/86* (2006.01)

(52) U.S. Cl.
CPC .. *H01M 8/0258* (2013.01); *H01M 2004/8684* (2013.01)

(58) Field of Classification Search
CPC ....... H01M 8/0258; H01M 2004/8684; H01M 2/00; H01M 8/241; H01M 8/026;
(Continued)

(56) References Cited

U.S. PATENT DOCUMENTS 5,840,438 A * 11/1998 Johnson ............. H01M 4/8626
429/481
7,125,620 B2 10/2006 Acker
(Continued)

FOREIGN PATENT DOCUMENTS

WO 2002045196 A2 6/2002
WO 2003077342 A2 9/2003

OTHER PUBLICATIONS

Jeong, K.-J., C.M. Miesse, J.-H. Choi, J. Lee, J. Han, S.P. Yoon, S.W. Nam, T.-H. Lim, and T.G. Lee, 'Fuel crossover n direct formic acid fuel cells', Journal of Power Sources, 2007, 168, 119-125.
(Continued)

*Primary Examiner* — Alexander Usyatinsky
(74) *Attorney, Agent, or Firm* — A. J. Bahou; Blake Bernard; Waller, Lansden, Dortch & Davis LLP

(57) ABSTRACT

An improved or advanced electrically conductive selectively gas permeable anode flow field (SGPFF) design, allowing for efficient removal of $CO_2$ perpendicular to the active area near the location where it is formed in the catalyst layer. The anode plate design includes two mating flow fields (an anode gaseous flow field, and an anode liquid flow field) separated by a semi-permeable separator. The separator comprises a hydrophobic semi-permeable separator for $CO_2$ diffusive gas transport from the liquid side (with formic acid, water, and $CO_2$) to the gaseous side (allowing for $CO_2$ removal to the atmosphere).

3 Claims, 3 Drawing Sheets

(58) Field of Classification Search
CPC .............. H01M 8/1067; H01M 4/8605; H01M 8/1097; H01M 4/8896; H01M 8/1088; H01M 8/1037; H01M 8/1004; H01M 4/8626

See application file for complete search history.

(56) References Cited

U.S. PATENT DOCUMENTS

| | | | |
|---|---|---|---|
| 2003/0104256 A1* | 6/2003 | Van Der Woude | H01M 8/0258 429/412 |
| 2003/0131663 A1* | 7/2003 | Gore | G01N 9/14 73/444 |
| 2004/0009383 A1* | 1/2004 | Michels | H01M 8/04029 429/438 |
| 2004/0028984 A1* | 2/2004 | DeFilippis | H01M 8/0228 429/444 |
| 2005/0208366 A1* | 9/2005 | Rohwer | H01M 8/241 429/413 |
| 2009/0035644 A1* | 2/2009 | Markoski | H01M 8/04291 429/442 |
| 2013/0089809 A1* | 4/2013 | Farrington | H01M 8/0273 429/492 |

OTHER PUBLICATIONS

Neber, A.Z. and J. Newman, 'Transport in Polymer-Electrolyte Membranes', Journal of the Electrochemical Society, 2003, 150, A1008-A1015.

Jhm, S., S T. Chung, and J. Lee, 'Characterization of direct formic acid fuel cells by Impedance Studies: In comparison of direct methanol fuel cells', Journal of Power Sources, 2008, 178, 34-43.

Watanabe, M. and S. Motoo, 'Electrocatalysis by ad-atoms: Part II. Enhancement of the oxidation of methanol on platinum by ruthenium ad-atoms', Journal of Electroanalytical Chemistry and interfacial Electrochemistry, 1975, 60, 267-273.

Pan, Y., R. Zhang, and S.L. Blair, 'Anode Poisoning Study in Direct Formic Acid Fuel Cells', Electrochemical and Solid-State Letters, 2009, 12, B23-B26.

Ku, X. and P.G. Pickup, 'Deactivation resistant PdSb/C catalysts for direct formic acid fuel cells', Electrochem. Commun., 2010, 12, 800-803.

Ku, X. and P.G. Pickup, 'Carbon Supported PtBi Catalysts for Direct Formic Acid Fuel Cells', Electrochimica Acta, 2011, In Press, Accepted Manuscript.

Tripkovic, A.V., K.D. Popovic, R.M. Stevanovic, R. Socha, and A. Kowal, 'Activity of a PtBi alloy in the electrochemical oxidation of formic acid', Electrochem Commun., 2006, 8, 1492-1498.

Wang, L.L. and D.D. Johnson, 'Electrocatalytic Properties of PtBi and PtPb Intermetallic Line Compounds via Df I: Co and H adsorption', Journal of Physical Chemistry C, 2008, 112, 8266-8275.

Leiva, E., T. Iwasita, E. Herrero, and J.M. Feliu, 'Effect of Adatoms in the Electrocatalysis of HCOOH Oxidation. A Theoretical Model', Langmuir, 1997, 13, 6287-6293.

Benfield, R.E., 'Mean coordination Nos. and the non-metal-metal transition in clusters', J. Chem. Soc., Faraday Trans., 1992, 88, 1107-10.

Park, S.,Y Xie, and M.J. Weaver, 'Electrocatalytic Pathways on Carbon-Supported Platinum Nanoparticles Comparison of Particle-Size-Dependent Rates of Methanol, Formic Acid, and Formaldehyde Electrooxidation', Langmuir, 2002, 18, 5792-5798.

Meurock, M., M. Janik, and A. Wieckowski, 'A first principles comparison of the mechanism and site requirements for the electrocatalytic oxidation of methanol and formic acid over Pt', Faraday discussions, 2008, 140, 363-78; discussion 117-37.

Masel, R L, Y. Zhu, and R.T. Larsen, Fuel cells using palladium-based electrocatalysts, 2005, The Board of Trustees of the University of Illinois, USA . p. 12 pp., US Patent. No. 407,385.

Zhou, W. and J.Y. Lee, 'Particle Size Effects in Pd-Catalyzed Electrooxidation of Formic Acid', Journal of Physical Chemistry C, 2008, 112, 3789-3793.

Jung, W.S., J. Han, and S. Ha, 'Analysis of palladium-based anode electrode using electrochemical impedance spectra in direct formic acid fuel cells', Journal of Power Sources, 2007, 173, 53-59.

Rice, C., Tong, E. Oldfield, A. Wieckowski, F. Hahn, F. Gloaguen, J.-M. Leger, and C. Lamy, 'In Situ Infrared Study of Carbon Monoxide Adsorbed onto Commercial Fuel-Cell-Grade Carbon-Supported Platinum Nanoparticles: Correlation with 13C Nmr Results', The Journal of Physical Chemistry B, 2000, 104, 5803-5807.

Buzzo, G.S., R.V. Niquirilo, and H.B. Suffredini, 'Active Pt-PbOx/C anodes to promote the formic acid oxidation in presence of sulfuric acid', J. Braz. Chem. Soc., 2010, 21, 185-190.

Ghosh, T., Q. Zhou, J.M. Gregoire, R.B. van Dover, and F.J. DiSalvo, 'Pt-Cd and Pt-Hg Phases As High Activity Catalysts for Methanol and Formic Acid Oxidation', The Journal of Physical Chemistry C, 2010, 114, 12545-12553.

Haan, J.L., K.M. Stafford, and R.L Masel, 'Effects of the Addition of Antimony, Tin, and Lead to Palladium Catalyst Formulations for the Direct Formic Acid Fuel Cell', The Journal of Physical Chemistry C, 2010, 114, 11665-11672.

Zhang, S., Y. Shao, G. Yin, and Y. Lin, 'Facile synthesis of PtAu alloy nanoparticles with high activity for formic acid oxidation'. Journal of Power Sources, 2010, 195, 1103-1106.

Zhang, S., Y. Shao, G. Yin, and Y. Lin, 'Electrostatic Self-Assembly of a Pt-around-Au Nanocomposite with High Activity towards Formic Acid Oxidation', Angewandte Chemie International Edition, 2010, 49, 2211-2214.

Matsui, H., K. Saitou, and K. Kashu, 'Electrocatalytic activity of Pt-Sb alloys in oxidation of formic acid and methanol', ECS Transactions, 2008, 6, 225-230.

Liu, F. and C.-Y. Wang, 'Optimization of cathode catalyst layer for direct methanol fuel cells: Part II: Computational modeling and design', Electrochimica Acta, 2006, 52, 1409-1416.

Liu, F. and C.-Y. Wang, 'Mixed Potential in a Direct Methanol Fuel Cell', Journal of The Electrochemical Society, 2007, 154, B514-B522.

Li, G. and P.G. Pickup, 'Ionic Conductivity of PEMFC Electrodes', Journal of the Electrochemical Society, 2003, 150, C745-C752.

Nang, C.-Y., 'Fundamental Models for Fuel Cell Engineering', Chemical Reviews, 2004, 104, 4727-4765.

Law, W.L., A.M. Platt, P.D.C. Wimalaratne, and S.L. Blair, 'Effect of Organic Impurities on the Performance of Direct Formic Acid Fuel Cells', Journal of the Electrochemical Society, 2009, 156, B553-B557.

Masel, R.L, Y. Zhu, Z. Khan, and M. Man, Low contaminant formic acid fuel for direct liquid fuel cell, 2006, The Board of Trustees of the University of Illinois, US Patent. p. 14.

C.W. Wong, T.S. Zhao, Q. Ye, J.G. Liu, J. Electrochem. Soc., 152 A1600 (2005).

H. Yang, T.S. Zhao, Electrochemica Acta 50 (2005) 3243.

J.P. Meyers, J. Newman, J. Electrochem. Soc. (2002) 149, A710.

J.P. Meyers, J. Newman, J. Electrochem. Soc. 149 (2002), A718.

J.P. Meyers, J. Newman, J. Electrochem. Soc. 149 (2002), A729.

K. Scott, P. Argyropoulos, P. Yiannopoulos, W.M. Taama, Journal of Applied Electrochemistry 31 (2001) 823.

M.M. Mench, S. Boslet, S. Thynell, J. Scott and C.Y. Wang, Proceeding of the Symposium on Direct Methanol Fuel Dells, 199th Electrochemistry Society Proc. Series, Princeton, NJ, 2001.

P. Argyropoulos, K. Scott, W.M. Taama, Chern. Eng. Journal 78 (2000) 29.

Qiang Liao, Xun Zhu, Xueyan Zheng, Yudong Ding, J. Power Sources 171 (2007) 644.

R.B. Mrazek, C.E. Wicks, K.N.S. Prabhu, J. Chemical and Engineering Data 13 (1968) 508.

R.H. Brooks, A T. Corey, Hydrology Papers, 3, Colorado State University, 1964, p. 1.

T.A. Zawodzinski, C. Derouin, S. Radzinski, R.J. Sherman, V.T. Smith, T.E. Springer, S. Gottesfeld, J. Electrochem. Soc. 140 (1993)1041.

T.E. Springer, T.A. Zawodzinski, S. Gottesfeld, J. Electrochem. Soc. 138 (1991) 2334.

(56) References Cited

OTHER PUBLICATIONS

W. Liu, C.Y. Wang, J. Electrochem. Soc. 154 (2007), B352.

W. Liu, C.Y. Wang, J. Power Sources 164 (2007) 189.

Zhou, Y., J. Liu, J. Ye, Z. Zou, J. Ye, J. Gu, T. Yu, and A. Yangc, 'Poisoning and regeneration of Pd catalyst in direct formic acid fuel cell', Electrochimica Acta, 2010, 55, 5024 5027.

Watanabe, M., M. Horiuchi, and S. Motoo, 'Electrocatalysis by ad-atoms. PartXXIII. Design of platinum ad-electrodes for formic acid fuel cells with ad-atoms of the IVth and the Vth groups', Journal of Electroanalytical Chemistry and nterfacial Electrochemistry, 1988, 250, 117-25.

Bai, Y.-C., W.-D. Zhang, C.-H. Chen, and J.-Q. Zhang, 'Carbon nanotubes-supported PtAu-alloy nanoparticles for electro-oxidation of formic acid with remarkable activity', Journal of Alloys and Compounds, 2011, 509, 1029-1034.

S. Z. Rejala, M. S. Masdarab, S. K. Kamarudina, Energy and Environmental Engineering Journal 2013, 2, 7.

H. Jeon, B. Jeong, J. Joo, J. Lee, Electrocatalysis 2015, 6, 20.

C. A. Rice, A. Bauskar, p. G. Pickup, Recent advances in electrocatalysis of formic acid oxidation, in Electrocataly- sis n Fuel Cells: A Non and Low Platinum Approach, Lee- ture Notes in Energy 9, (Ed: M. Shao), Springer-Verlag, London, England, 2013, p. 69.

X. Yu, P. G. Pickup, J. of Power Sources 2008, 182,124.

H. A Gasteiger, J Garche, in: Handbook of Heterogeneous Catalysis, (Ed: G. Ertl), Wiley-VCH Verlag GmbH & Co., Weinheim, Germany, 2008, p. 3081.

B. Beden, F. Hahn, S Juanto, C. Lamy, J M. Leger, J of Electroanalytical Chemistry and Interfacial Electrochemistry 1987, 225, 215.

A. Capon, R. Parsons, J. of Electroanalytical Chemistry and Interfacial Electrochemistry 1973, 45, 205.

A. S. Bauskar, C. A. Rice, Electrochimica Acta 2012, 62, 36.

P. Argyropoulos, K. Scott, W. M. Taama, Electrochimica Acta 1999, 44, 3575.

G. Q. Lu, C. Y. Wang, J. of Power Sources 2004, 134, 33.

H. Yang, T. S. Zhao, Q. Ye, J. of Power Sources 2005, 139, 79.

V. B. Oliveira, C. M. Rangel, A. M. F. R. Pinto, Chemical Engineering Journal 2010, 157, 174.

S. Jung, Y. Leng, C.-Y. Wang, Electrochimica Acta 2014, 134, 35.

M. Li, J. Liang, C. Liu, G. Sun, G. Zhao, Sensors 2009, 9, 3314.

C. Litterst, S. Eccarius, C. Hebling, R. Zengerle, P. Koltay, Journal of Micromechanics and Microengineering 2006, 16, 5248.

F. Hutzenlaub, N. Paust, R. Zengerle, C. Ziegler, Journal of Power Sources 2011, 196, 8048.

3. D. Meng, C.-J. Kim, Lab Chip 2008, 8, 958.

D. D. Meng, C. J. Kim, Journal of Power Sources 2009, 194, 445.

A. Hamnett, Catalysis Today 1997, 38, 445.

A. Arvay, E. Yli-Rantala, C. H. Liu, X. H. Peng, P. Koski, L. Cindrella, P. Kauranen, P. M. Wilde, A. M. Kannan, J. of Power Sources 2012, 213, 317.

E. C. Kumbur, K. V. Sharp, M. M. Mench, J. of Power Sources 2007, 168, 356.

S. Park, J.-W. Lee, B. N. Popov, International J. of Hydrogen Energy 2012, 37, 5850.

S. Park, J.-W. Lee, B. N. Popov, J. of Power Sources 2008, 177, 457.

G. Lin, T. V. Nguyen, J. of the Electrochemical Society 2005, 152, A1942.

G.-G. Park, Y.-J. Sohn, T.-H. Yang, Y.-G. Yoon, W.-Y. Lee, C.-S. Kim, J. of Power Sources 2004, 131, 182.

K. T. Cho, M. M. Mench, Physical Chemistry Chemical Physics 2012, 14, 4296.

S. Park, J.-W. Lee, B. N. Popov, J. of Power Sources 2006, 163, 357.

On-Power, Sigracet, GDL 24 & 25 Series Gas Diffusion Layer, http://www.ion-power.com/res/Sigracet/GDL_ 24_25_Series_07. pdf.

On-Power, Sigracet, GDL 10 Series Gas Diffusion Layer, http://www.ion-power.com/res/Sigracet/ GDL_10_Series_07. odf.

J. Bear, Dynamics of Fluids in Porous Media, Ed. Dover Publications, Mineola, New York, 1988.

Gottesfeld, S., 'Design concepts and durability challenges for mini fuel cells', in Handbook of Fuel Cells -Fundamentals, Technology and Applications, W. Vielstich, H. Yokokawa, and H.A. Gasteiger, Editors. 2010, John Wiley & Sons, Ltd.: New York. p. 762-778.

Leger, J.-M., C. Coutanceau, and C. Lamy, 'Direct Methanol Fuel Cells: What's New Since Ten Years?', ECS Transactions, 2006, 1, 229-239.

Weber, M., J.T. Wang, S. Wasmus, and R.F. Savinell, 'Formic Acid Oxidation in a Polymer Electrolyte Fuel Cell', Journal of the Electrochemical Society, 1996, 143, L158-L160.

Ha, S., C.A. Rice, R.L Masel, and A. Wieckowski, 'Methanol conditioning for improved performance of formic acid fuel cells'. Journal of Power Sources, 2002, 112, 655-659.

Rice, C., S. Ha, R.L Masel, P. Waszczuk, A. Wieckowski, and T. Barnard, 'Direct formic acid fuel cells', Journal of Power Sources, 2002, 111, 83-89.

Naszczuk, P., T.M. Barnard, C. Rice, R.L Masel, and A. Wieckowski, 'A nanoparticle catalyst with superior activity for alectrooxdation of formic acid', Electrochem. Commun., 2002,4, 732.

Masel, R.I., C.A. Rice, P. Waszczuk, and A. Wieckowski, Fuel cells and fuel cells catalysts, U.S. Patent, 2003, The Board of Trustees of the University of Illinois, USA p. 52 pp.

McGovern, M.S., E.C. Garnett, C. Rice, R.L Masel, and A. Wieckowski, 'Effects of Nation as a binding agent for unsupported nanoparticle catalysts', J. Power Sources, 2003, 115, 35-39.

Rhee, Y.-W., S.Y. Ha, and R.L Masel, 'Crossover of formic acid through Nation membranes', J. Power Sources, 2003, 117, 35-38.

Rice, C., S. Ha, R.L Masel, and A. Wieckowski, 'Catalysts for direct formic acid fuel cells', J. Power Sources, 2003, 115, 229-235.

Parsons, R. and T. VanderNoot, 'The oxidation of small organic molecules. A survey of recent fuel cell related Yesearch', Journal of Electroanalytical Chemistry and Interfacial Electrochemistry, 1988, 257, 9-45.

Ross, P.N., Jr., The science of electrocatalysis on bimetallic surfaces. 1998: Wiley-VCH.

Ren, X., J.J. Becerra, G. Beckmann, E.J. Brown, M.S. DeFilippis, J.K. Neutzler, and S. Gottesfeld, Method of controlling delivery of fuel to a direct oxidation fuel cell, U.S Patent, 2009, MTI Microfuel Cells Inc.: USA.

Inc., D.G., Fuel Cells for Portable Power: Markets, Manufacture and Cost, 2003, Breakthrough Technologies & U.S. Fuel Cell Council: Corona, California.

Mauritz, K.A. and R.B. Moore, 'State of understanding of nation', Chem Rev, 2004, 104,4535- 85.

Gierke, T.D., G.E. Munn, and F.C. Wilson, J. Polym. Sci., Polym. Phys., 1981, 19, 1687.

Hsu, W.Y. and T.D. Gierke, 'Ion transport and clustering in Nation perfluorinated membranes', Journal of Membrane Science, 1983, 13, 307-326.

Chu, K.-L., M.A. Shannon, and R.I Masel, 'An Improved Miniature Direct Formic Acid Fuel Cell Based on Nanoporous Silicon for Portable Power Generation', J Electrochem. Soc., 2006, 153, A1562-A1567.

Capon, A. and R. Parsons, 'The oxidation of formic acid on noble metal electrodes: Il A comparison of the behaviour of pure electrodes', Journal of Electroanalytical Chemistry and interfacial Electrochemistry, 1973, 44, 239-254.

Bewick, A. and B. Pons, 'Advances in Infrared and Raman Spectroscopy', R.J.H. Clark and R.E. Hester, Editors. 1985, John Wiley and Sons. p. 360.

Yu, X. and P.G. Pickup, 'Mechanistic study of the deactivation of carbon supported Pd during formic acid oxidation', Electrochem Commun., 2009, 11, 2012-2014.

Zhou, Y., J. Liu, J. Ye, Z. Zou, J. Ye, J. Gu, T. Yu, and A. Yang, 'Poisoning and regeneration of Pd catalyst in direct formic acid fuel cell', Electrochim. Acta, 2010, 55, 5024-5027.

Daniele, S. and S. Bergamin, 'Preparation and voltammetric characterisation of bismuth- modified mesoporous platinum microelectrodes. Application to the electrooxidation of formic acid', Electrochem. Commun., 2007, 9, 1388-1393.

Beden, B. and C. Lamy, 'Spectroelectrochemistry: Theory and Practice', R.J. Gale, Editor. 1988, Plenum Press: New York. p. 450.

Vielstich, W., Co, formic acid, and methanol oxidation in acid electrolytes-mechanisms and electrocatalysis. 2003 Wiley.

(56) References Cited

OTHER PUBLICATIONS

Motoo, S. and M. Watanabe, 'Electrocatalysis by ad-atoms: Part VII. Enhancement of CO oxidation on platinum by As ad-atoms', Journal of Electroanalytical Chemistry and interfacial Electrochemistry, 1980,111, 261-268.

Jarvi, T D and E M Stuve, Fundamental aspects of vacuum and electrocatalytic reactions of methanol and formic acid an platinum surfaces. 1998: Wiley-VCH.

Rice, C., S. Ha, R.L Masel, P. Waszczuk, and A. Wieckowski, 'Characteristics of formic acid fuel cells', Proc. Power Sources Conf., 2002, 40th, 254-257.

Ge, J., X. Chen, C. Liu, T. Lu, J. Liao, L. Liang, and W. Xing, 'Promoting effect of vanadium ions on the anodic Pd/C catalyst for direct formic acid fuel cell application', Electrochim. Acta, 2010, 55, 9132-9136.

Lee, J.K., H. Jeon, S. Uhm, and J. Lee, 'Influence of underpotentially deposited Sb onto Pt anode surface on the performance of direct formic acid fuel cells', Electrochim. Acta, 2008, 53, 6089-6092.

Wu, X. and P.G. Pickup, 'Pb and Sb modified Pt/C catalysts for direct formic acid fuel cells', Electrochimica Acta, 2010, 55, 7354-7361.

Kang, Y., M. Ren, T. Yuan, Y. Qiao, Z. Zou, and H. Yang, 'Effect of Nation aggregation in the anode catalytic layer on the performance of a direct formic acid fuel cell', J Power Sources, 2010, 195, 2649-2652.

Siddique, N.A. and F. Liu, 'Process based reconstruction and simulation of a three-dimensional fuel cell catalyst layer', Electrochimica Acta, 2010, 55, 5357-5366.

Haan, J.L. and R.L Masel, 'The influence of solution pH on rates of an electrocatalytic reaction: Formic acid electrooxidation on platinum and palladium', Electrochimica Acta, 2009, 54, 4073-4078.

Marcus, R.A., 'Electron transfer at electrodes and in solution: comparison of theory and experiment', Electrochim. Acta, 1968, 13, 995-1004.

Sambandam, S. and V. Ramani, 'SPEEK/functionalized silica composite membranes for polymer electrolyte fuel cells', J. Power Sources, 2007, 170, 259-267.

A.A. Kulikovsky, Electrochemica Acta 51 (2006) 2003.

AA. Kulikovsky, Electrochemical communications 7 (2005) 237.

B.E. Poling, J.M. Prausnitz, J.P. O'Connell, "The properties of Gases and Liquids", 5th ed., McGraw-Hill, New York, 2001.

C.Y. Wang, P. Cheng, Int. Journal of Heat Mass Transfer 39 (1996) 3607.

D. Michael, Lundin, J. Mark, McCready, J. Power Sources 172 (2007) 553.

E. Barendrecht, Fuel cell systems, 75, L.J.M.J. Blowen & M.N. Mugerwa, New York, 1993.

G. Lu and, C.Y. Wang, an invited chapter for New Developments in Heat Transfer, Chapter 9, 317 (2005).

J. Ge, H. Liu, J. Power Sources 163 (2007) 907.

S. Jung, C.Y. Wang, J. Power Sources 248 (2014) 253.

S. Jung, J. Power Sources 231 (2013) 60.

T. Bewer, T. Beckmann, H. Dohle, J. Mergel, D. Stolten, J. Power Sources 125 (2004) 1.

T.A. Zawodzinski, J. Davey, J. Valerio, S. Gottesfeld, Electrochemica Acta 40 (1995) 297.

Z.J. Derlacki, A.J. Easteal, V.J. Edge, LA. Woolf, Z. Roksandic, J. Physical Chemistry 89 (1985) 5318.

Capon, A. and R. Parsons, 'The oxidation of formic acid on noble metal electrodes: II. A comparison of the behaviour at pure electrodes', Journal of Electroanalytical Chemistry and interfacial Electrochemistry, 1973, 44, 239-254.

Wang, X., J.-M. Hu, and I.M. Hsing, 'Electrochemical investigation of formic acid electro- oxidation and its crossover through a Nation membrane', J. Electroanal. Chem., 2004, 562, 73-80.

Watanabe, M., M. Horiuchi, and S. Motoo, 'Electrocatalysis by ad-atoms. PartXXIII. Design of platinum ad-electrodes tor formic acid fuel cells with ad-atoms of the IVth and the Vth groups', Journal of Electroanalytical Chemistry and nterfacial Electrochemistry, 1988, 250, 117-25.

Gu, X., X. Cong, and Y. Ding, 'Platinum-Decorated Au Porous Nanotubes as Highly Efficient Catalysts for Formic Acid Electro-Oxidation', ChemPhysChem, 2010, 11, 841-846.

Bai, Y.-C., W.-D. Zhang, C.-H. Chen, and J.-Q. Zhang, 'Carbon nanotubes-supported PtAu-alloy nanoparticles for alectro-oxidation of formic acid with remarkable activity', Journal of Alloys and Compounds, 2011, 509, 1029-1034.

\* cited by examiner

ADVANCED SELECTIVELY GAS PERMEABLE ANODE FLOW FIELD DESIGN FOR EFFICIENT REMOVAL OF CARBON DIOXIDE IN A DIRECT FORMIC ACID FUEL CELL

This application claim benefit of and priority to U.S. Provisional Application No. 62/462,970, filed Feb. 24, 2017, the entire disclosure, specification, figures, and appendices of which are incorporated herein by specific reference for all purposes.

This invention was made with the support of the United States government under Contract No. NSF EPS-1004083. The Government has certain rights in this invention.

FIELD OF INVENTION

This invention relates to a system and related methods for fuel cells for portable power.

DETAILED DESCRIPTION OF EXEMPLARY EMBODIMENTS

Figure 1:
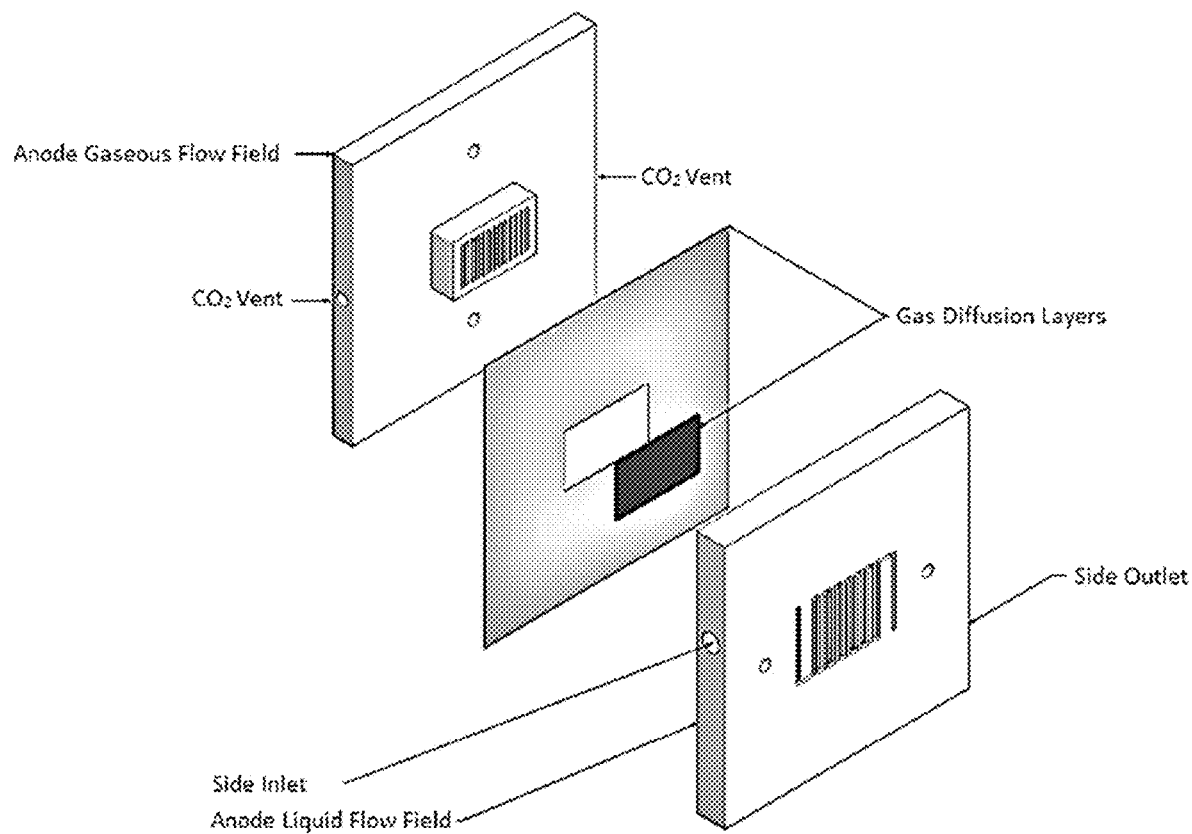
FIG. 1 shows a view of a system in accordance with an embodiment of the present invention.
Figure 2:
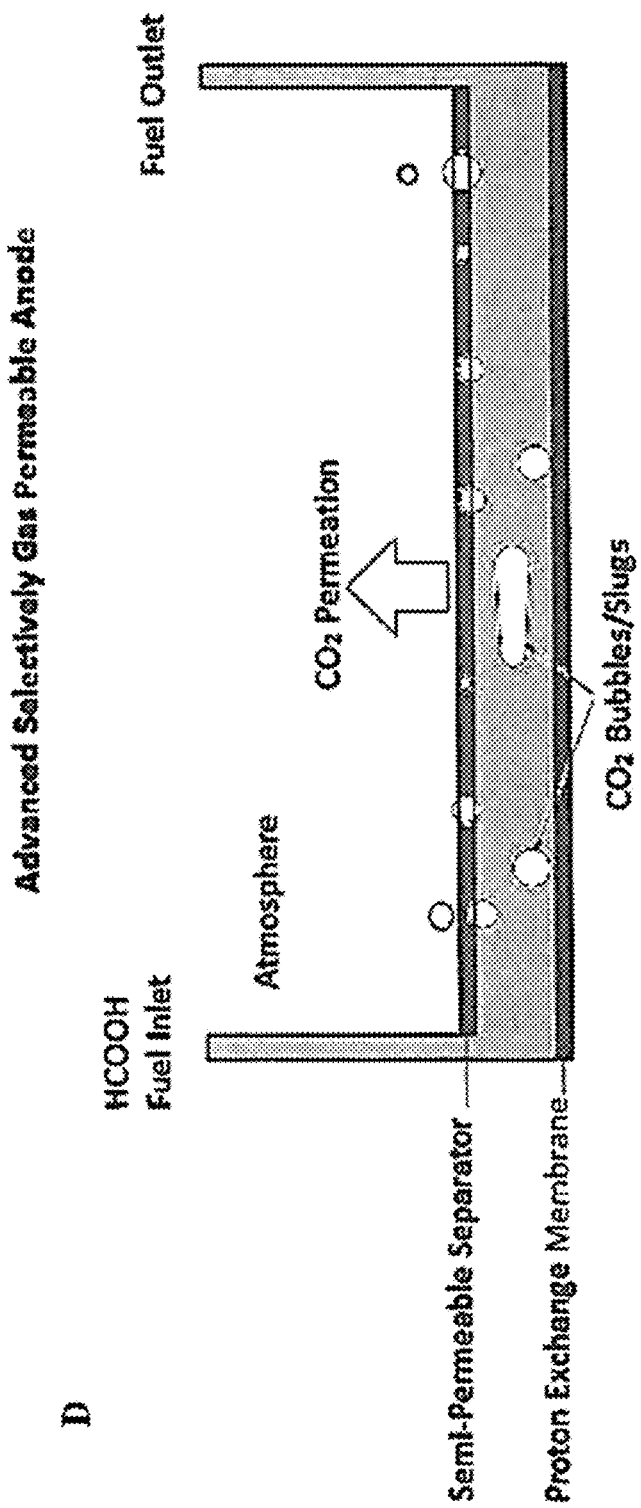
FIG. 2 shows a cross-sectional view of CO2 removal for the system of FIG. 1.
Figure 3:
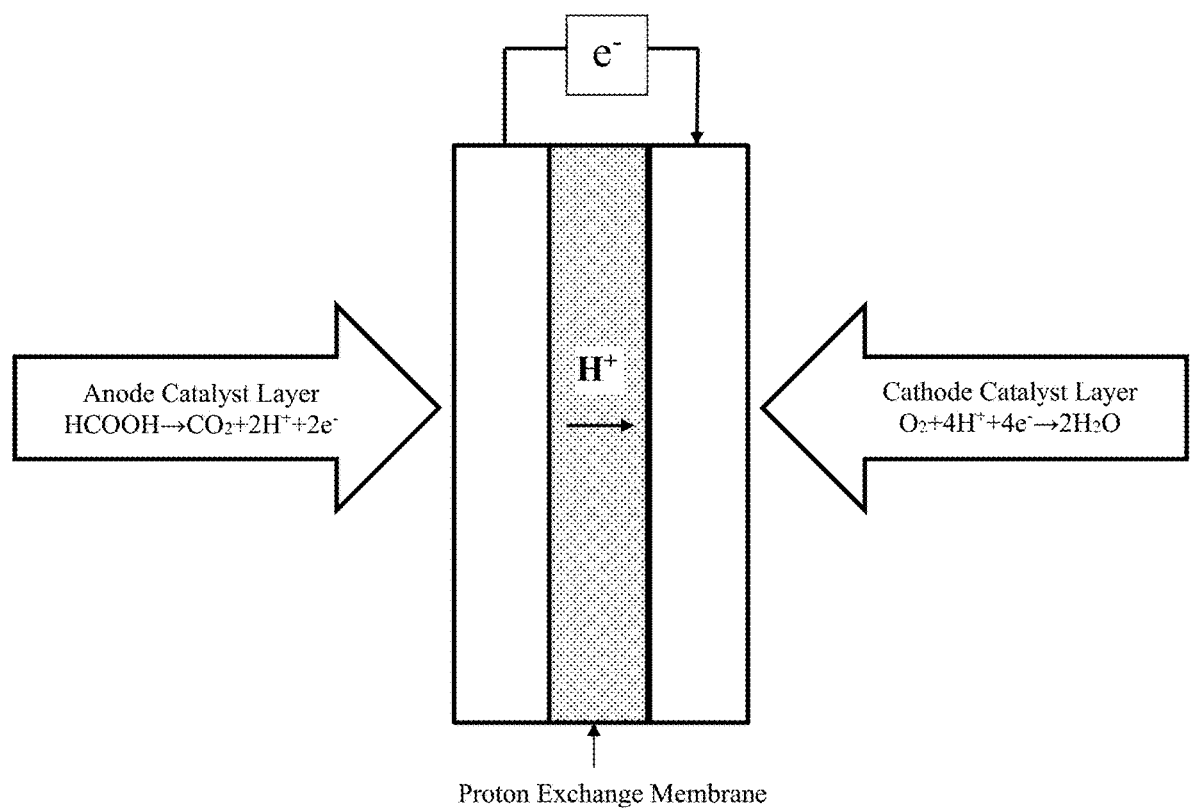
FIG. 3 shows an embodiment of a fuel cell of the present invention which utilizes the anode flow field of FIG. 1.

In various exemplary embodiments, the present invention comprises an improved or advanced electrically conductive selectively gas permeable anode flow field (SGPFF) design. Direct formic acid fuel cells are electrochemical energy conversion devices, and conventional serpentine anode flow field design limits carbon dioxide ($CO_2$) removal through a single flow field channel that transports the two-phase flow of $CO_2$ bubbles and formic acid. As seen in FIGS. 1 and 2, the present invention allows for efficient removal of $CO_2$ perpendicular to the active area near the location where it is formed in the catalyst layer. The anode plate design comprises two mating flow fields (an anode gaseous flow field, and an anode liquid flow field) separated by a semi-permeable separator. The separator comprises a hydrophobic semi-permeable separator for $CO_2$ diffusive gas transport from the liquid side (with formic acid, water, and $CO_2$) to the gaseous side (allowing for $CO_2$ removal to the atmosphere). In several embodiments, the separator comprises an electrically conductive material, which minimizes the electron transfer path length and increases fuel cell performance. In one embodiment, the separator comprises a hydrophobic macro/micro carbon-based material. The separator material also may comprise super-hydrophobic materials (e.g., contact angle greater than 150 degrees) that are more $CO_2$ permeable and liquid fuel impermeable, particularly at higher current densities.

In another exemplary embodiments, the location of the liquid feed and exit ports may be located elsewhere than where shown, such as on the gaseous-side of the flow field outside of the active area. Further the diameter of the separator media may be extended beyond the active area.

The fundamental power supply drivers for portable devices are (i) power rating, (ii) size, and (iii) continuous operation. Direct liquid fuel cells can surpass battery technology (now and in the future) for all three drivers. The invention disclosed herein increases power output and decreases size by increasing liquid fuel concentration in the anode catalyst layer. An additional advantage is that the present invention, as previously not possible in a fuel cell architecture, allows nearly 100% fuel conversion without an additional recycling loop.

These embodiments, as well as other exemplary embodiments, are described in detail in the materials which are attached to U.S. Provisional Application No. 62/462,970 and which are incorporated herein in their entirety (including all text and figures therein) by specific reference:

"Advanced Selectively Gas Permeable Anode Flow Field Design for Efficient Removal of Carbon Dioxide in a Direct Formic Acid Fuel Cell"

"Title: Direct Formic Acid Fuel Cell Materials Design for Portable Power"

The present invention provides several advantages: electrical continuity and sustained power generation, amenability to large fuel cell geometric areas of 5 cm2 or larger, compliance with stack level integration for high voltage operation, and amenability to "dead-end operation" to reduce system volume and improve fuel utilization. Overall, the present invention results in the improved performance of direct liquid fuel cells by removing $CO_2$ (a reaction by-product) from the feed stream in elevated fuel concentrations at catalytic sites (i.e., enhanced mass transport due to improved concentration gradient) and higher electron transport due to the shortened path).

A fuel cell using the present invention thus can be used as the primary liquid fuel cell in all portable fuel cell powered devices, and thus can replace batteries in devices such as cell phones, tablet computers, mobile computing devices, laptops, remote sensors, drones, unmanned vehicles, hobby or remote-controlled vehicles, power tools, and auxiliary power units for recreational vehicles, trucks, and buildings.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A direct formic acid fuel cell including an electrically conductive selectively gas permeable anode flow field (SGPFF), the fuel cell comprising:
    an anode plate design comprising two mating flow fields
        an anode gaseous flow field and an anode liquid flow field separated by a semi-permeable separator, the semi-permeable separator comprising an electrically conductive material.

2. The direct formic acid fuel cell of claim 1, wherein the separator comprises a hydrophobic semi-permeable separator for CO2 diffusive gas transport from the liquid side to the gaseous side.

3. The direct formic acid fuel cell of claim 1, wherein the semipermeable separator is made from hydrophobic microporous carbon material coated with a microporous carbon layer.

* * * * *